(12) United States Patent
Casteras

(10) Patent No.: US 8,425,121 B2
(45) Date of Patent: Apr. 23, 2013

(54) ROLLING BEARING WITH SPHERICAL SEPARATORS

(75) Inventor: Christophe Casteras, Toulouse (FR)

(73) Assignee: Centre National d'Etudes Spatiales, Paris (FR)

( * ) Notice: Subject to any disclaimer, the term of this patent is extended or adjusted under 35 U.S.C. 154(b) by 243 days.

(21) Appl. No.: 12/736,646

(22) PCT Filed: Apr. 29, 2009

(86) PCT No.: PCT/FR2009/050792
§ 371 (c)(1),
(2), (4) Date: Nov. 15, 2010

(87) PCT Pub. No.: WO2009/138695
PCT Pub. Date: Nov. 19, 2009

(65) Prior Publication Data
US 2012/0039557 A1   Feb. 16, 2012

(30) Foreign Application Priority Data

Apr. 30, 2008   (FR) ..................................... 08 52948

(51) Int. Cl.
*F16C 19/56*   (2006.01)
(52) U.S. Cl.
USPC ........................................................ 384/521
(58) Field of Classification Search .................. 384/521
See application file for complete search history.

(56) References Cited

U.S. PATENT DOCUMENTS

| | | | | |
|---|---|---|---|---|
| 366,117 A * | 7/1887 | Lake | | 384/521 |
| 633,774 A * | 9/1899 | Von Zweigbergk | | 384/521 |
| 854,505 A | 5/1907 | Keiper | | |
| 3,989,324 A * | 11/1976 | Traut | | 384/521 |
| 4,141,607 A | 2/1979 | Traut | | |

FOREIGN PATENT DOCUMENTS

| | | |
|---|---|---|
| DE | 194 836 | 12/2006 |
| EP | 1 022 476 | 7/2000 |
| FR | 1 301 967 | 7/1962 |

* cited by examiner

*Primary Examiner* — Thomas R Hannon
(74) *Attorney, Agent, or Firm* — Jacobson Holman PLLC

(57) ABSTRACT

This ball (2) rolling bearing (1) comprises an outer ring (7) and an inner ring (8) between which the balls (2) roll around an axis of rolling (X1), spherical separators (3) for the balls (2), and a raceway (14) of revolution about the axis of rolling (X1) and along which the said spherical separators (3) roll. The raceway is a channel section (14) formed in an element (13; 23) secured to or forming part of one of the said rings (7; 8) and having a substantially semi-cyclic cross section of a diameter suited to that of the said spherical separators (3) so as to accommodate the said separators resting in positions in which they are retained laterally and free of contact with the other of the said rings (8; 7). A rolling bearing such as this is particularly well suited to use without lubrication, particularly in the space industry.

7 Claims, 3 Drawing Sheets

ROLLING BEARING WITH SPHERICAL SEPARATORS

This is a 371 of PCT/FR09/050792 filed Apr. 29, 2009, which has a priority of French no. 0852948 filed Apr. 30, 2008, hereby incorporated by reference.

The present invention concerns a rolling bearing device with spherical separators, of the ball type. It in particular concerns ball bearing with oblique contact, particularly a ball bearing that can be used in the space industry.

There are cases, in particular in the space industry, where sufficient lubrication of a ball bearing is not possible. This is in particular the case when a lubricant is likely to create pollution of the system it equips, for example a telescope or a strip selection mirror. This is also the case when the rolling bearing is in contact with chemical mediums, for example in a liquid propellant pump or an ammonia pump.

In other cases, for example when the rolling bearing is used to allow weak oscillations, lubrication is generally ineffective.

In the case of non-lubricated or poorly lubricated ball bearings, the lifetime of the cages or the ball separators, for which contact with the balls is essentially sliding, is greatly reduced.

Spherical separators make it possible to replace the essentially sliding contacts of the separators generally used with contacts rolling contacts between the spherical rolling bearing balls and separator. This makes it possible to extend the lifetime of the rolling bearings. These spherical separators are guided in an auxiliary raceway, which is unique to them. Each spherical separator therefore rolls, simultaneously and with play, on the raceway and on two neighboring rolling bearing balls that it separates.

In the prior art, such a separator is positioned such that its axis of rotation is as parallel as possible to the axis of rotation of the balls and the axis of rotation of the rings (rolling bearing axis). This requirement causes major constraints in terms of bulk and production of the outer and inner rings. Moreover, due to the aforementioned play that the balls and the spherical separators must have in relation to their guide members, the accumulation of this play can lead to situations where, in operation and at rest, a spherical separator laterally escapes between two balls.

Document EP 1 022 476 describes a ball rolling bearing with spherical separators in which the separators rest on a raceway formed in an element secured to one of the two rolling bearing rings. Depending on the geometry of that rolling bearing, the spherical separators are kept in position between the aforementioned raceway and the other ring.

Due to the play that the balls and spherical separators necessarily have, in operation the latter parts are necessary made to rest against the other ring. Yet this part either is fixed or rotates in the same direction as the balls, while the spherical separators rotate in the opposite direction from the balls. The spherical separators therefore rest on two parts that have very different speed components along a component with an axis parallel to the rolling axis, which creates sliding, and therefore friction and consequently wear.

Moreover, the spherical separators are in contact with the other ring along an edge or a conical part thereof, i.e. a very reduced surface that causes very significant Hertz stresses equivalent to wear factors.

The aim of the invention is to propose a rolling bearing with spherical separators that does not have the drawbacks of spherical separators of the prior art and makes it possible, in particular, to ensure the retention of the spherical separators while minimizing friction.

To that end, the invention concerns a ball rolling bearing comprising an outer ring and an inner ring between which the balls roll around an axis of rolling, spherical separators for the balls, and a raceway of revolution about the axis of rolling and along which said spherical separators roll, this rolling bearing being remarkable in that the raceway is a channel section formed in an element secured to or forming part of one of said rings and having a substantially semi-cyclic cross section of a diameter suited to that of said spherical separators so as to accommodate said separators resting in positions in which they are retained laterally and free of contact with the other of said rings.

According to the invention, the channel section with substantially semi-cyclic cross section and diameter suited to that of the spherical separators has, with regard to the separators, a surrounding shape that allows it simultaneously to:

ensure a lateral retention function of the spherical separators to prevent them from being ejected when stopped or in operation under the effect of the functional play and gravitational and/or centrifugal forces, prevent, to ensure this retaining function, the contact of the separators with another part having a very different speed, and minimize the Hertz stresses owing to the consequent contact surface between the spherical separators and the channel section.

With the rolling bearing according to the invention, each spherical separator has a component rotating about a radial axis and a component rotating about an axial axis such that its instantaneous axis of rotation varies very markedly and continuously. The points of contact of the separator with the neighboring balls and against the channel section therefore move on the surface of the separator, without staying on a same circle, such that the contacts occur on a large contact surface of the separator and the wear of the separator is thereby reduced. The wear also being better distributed, the separator keeps a substantially spherical shape for a longer time. The lifetime of the rolling bearing is thereby extended.

The invention also concerns a rolling bearing including one or several of the following features considered alone or in combination:

the separators have a radial offset angle smaller than or equal to 60°, preferably 30°, said angle being measured in a radial plane between, on one hand, a straight segment connecting marks left on a same side of the axis of rolling by the respective centers of said balls and said separators in said radial plane and, on the other hand, said axis of rolling;

the channel section is supported by an element secured in rotation with the outer ring or, alternatively, the inner ring;

the element supporting the channel section forms a single piece with said ring or, alternatively, is an annulus fastened and secured to said ring;

the rolling bearing is a rolling bearing with oblique contact.

The invention also concerns the use of a rolling bearing as defined above for a spacecraft and/or without lubrication.

Other particularities and advantages of the invention will emerge from the description below, relative to non-limiting examples.

Figure 1:
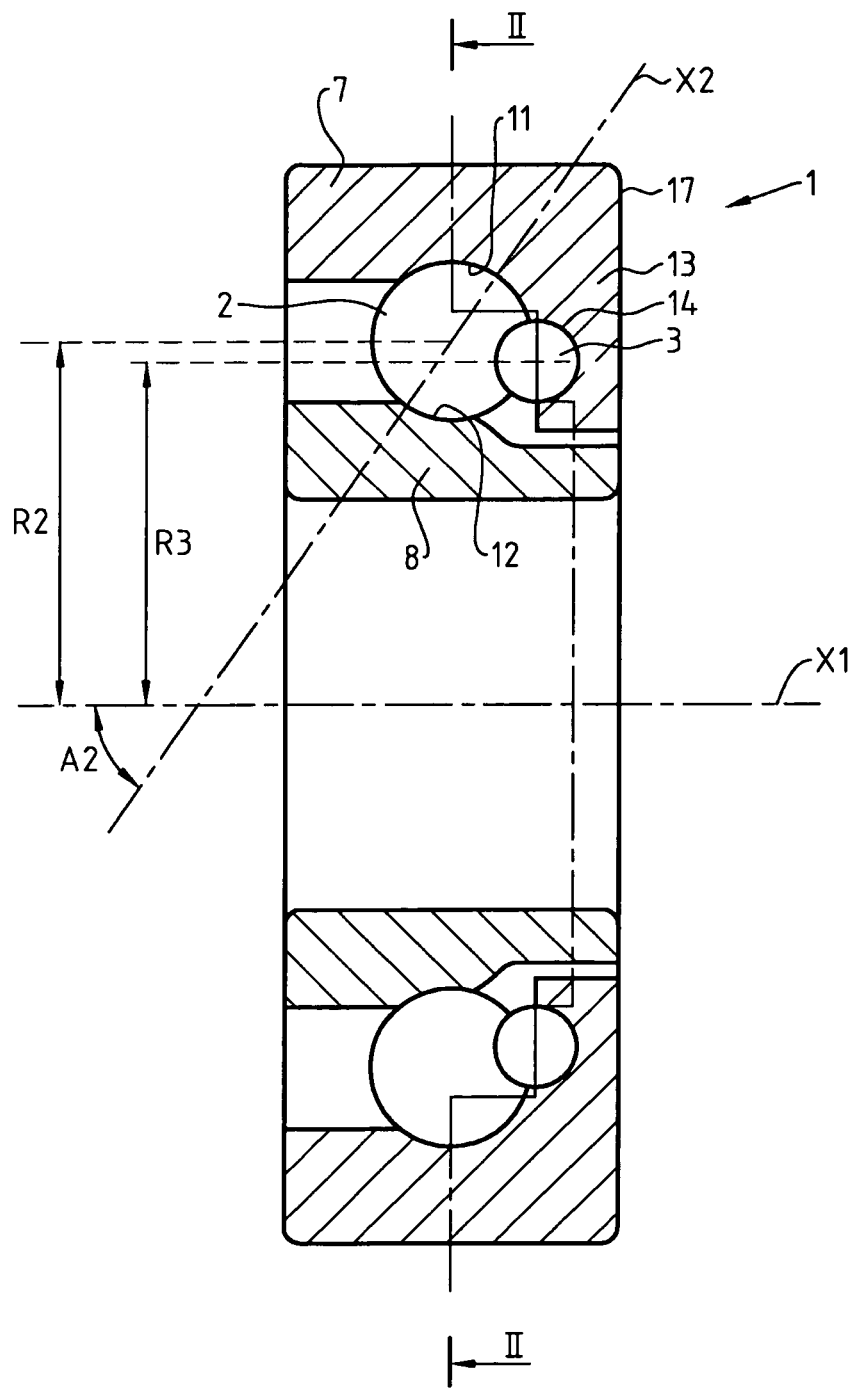
FIG. 1 is an axial diagrammatic section of a first embodiment for a rolling bearing according to the invention, along cutting line I-I of FIG. 2.

In the embodiment illustrated in FIG. 1, the rolling bearing 1 according to the invention is a ball 2 rolling bearing 1. The rolling bearing is substantially symmetrical about a longitudinal axis of rolling X1.

The rolling bearing balls are kept away from each other by separating balls 3. In the continuation of the description, for simplification, the rolling bearing balls 2 will be called balls 2 and the separating balls 3 will be called separators 3.

The plane of FIG. 1 is an axial plane, i.e. comprising the axis of rolling X1. The plane of FIG. 1 is a median plane of the illustrated two diametrically opposite balls 2. The illustrated separators 3 are in front of the plane of FIG. 2 and are shown there by orthogonal projection at the plane of FIG. 1.

The rolling bearing 1 comprises an outer ring 7 and an inner ring 8 each respectively forming an outer raceway 11 and an inner raceway 12 for the balls 2. The rolling bearing 1 is a rolling bearing with oblique contact, i.e. the rolling bearing balls 2 rest on the raceways along a contact axis X2 forming a non-right contact angle A2 with the axis of rolling X1.

At one 17 of its axial ends, the outer ring 7 comprises an extension 13 that extends substantially radially towards the axis X1. This extension 13 forms an auxiliary raceway, called channel section 14, for the rolling of the separators 3. The channel section allows the guiding of the separators, and defines their position relative to the outer raceway 11, therefore relative to the balls that the separators separate. The channel section revolves around the axis of rolling X1 and has a substantially semi-cyclic section, i.e. substantially in half-toroid form.

The diameter of the substantially semi-cyclic section of the channel section 14 is adapted to that of the separators 3, but operating play is provided for the rolling of the separators in the channel section. Such play makes it possible in particular to avoid assembly hyperstaticity and prevents the passage of pre-stress or loading stresses of the rolling bearing in the separators.

A radial distance R3 between the center of a separator 3 and the axis of rolling X1 is smaller than a radial distance R2 between the center of a ball 2 and the axis of rolling X1.

Figure 2:
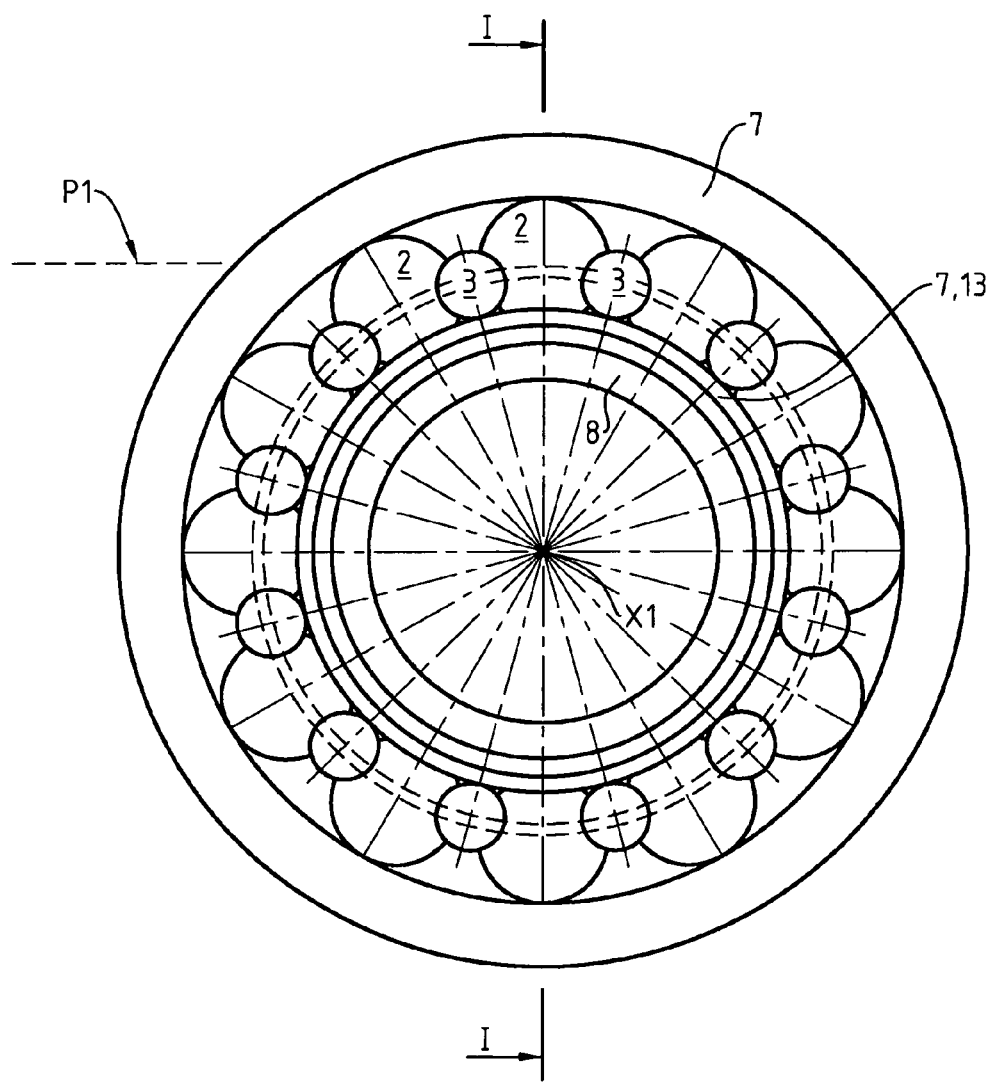
FIG. 2 is a transverse cross-section of the rolling bearing of FIG. 1 along cutting line II-II of FIG. 1.
Figure 3:
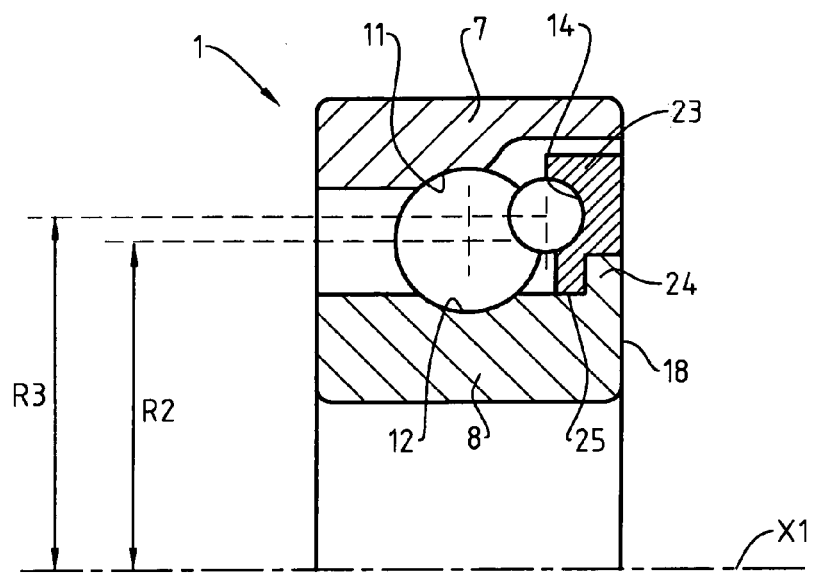
FIG. 3 is an axial half-section, similar to that of FIG. 1, of a second embodiment for a rolling bearing according to the invention.

The embodiment of a rolling bearing 1, illustrated in FIG. 3, will only be described in how it differs from that illustrated in FIGS. 1 and 2. The elements that are similar between the embodiments of FIGS. 1 and 3 bear the same references.

In the example illustrated in FIG. 3, there is no protuberance 13 supporting the channel section 14. In this example, the channel section is supported by an annulus 23. The annulus is fastened by locked nesting or adhesion on the inner ring 8, such that the inner ring 8 and the annulus 23 are secured in rotation, in a normal operating mode of the rolling bearing 1.

The inner ring 8 comprises, at one 18 of its axial ends, a shoulder 24 cooperating with a complementary shoulder 25 of the annulus 23, such that the annulus cannot move beyond the axial end 18, in particular under a contact stress between the balls and the separators.

The channel section 14 is positioned on the annulus 23, such that the radial distance R3 between the center of a separator 3 and the axis of rolling X1 is greater than the radial distance R2 between the center of a ball 2 and the axis of rolling X1.

Figure 4:
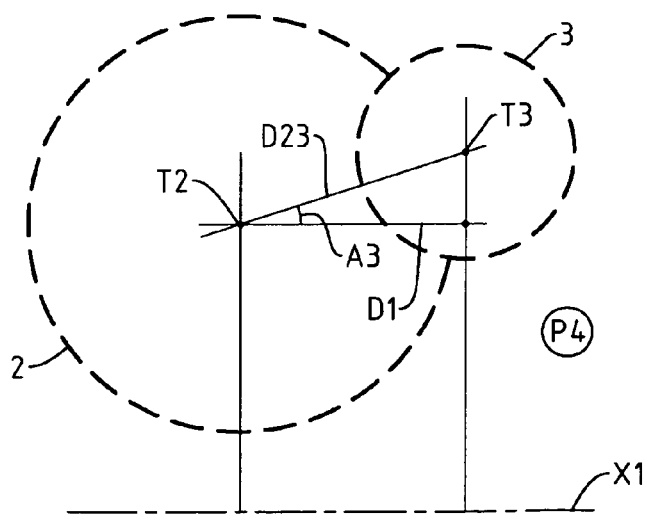
FIG. 4 illustrates the measurement of the radial offset angle.

FIG. 4 illustrates the measurement of a radial offset angle A3 of the separators 3 in relation to the balls 2, defined when the rolling bearing is in operation. The plane of FIG. 4 is a radial plane P4, i.e. a plane comprising the axis of rolling X1.

In FIG. 4, the points T2 and T3 illustrate the marks left in the plane P4, by the centers of the balls 3 and the separators 4, respectively, when they cross the plane P4, in its portion situated "above" the axis of rolling X1. The marks left by the respective peripheries of the balls and separators are shown in broken lines, under respective references 2 and 3.

The angle A3 is measured between a straight segment D23 connecting the marks T2 and T3, and the axis X1 or, as illustrated in FIG. 4, a straight line D1 parallel to the axis X1 in the plane P4.

According to the invention, the term "offset angle" refers to the actual offset angle, i.e. that established during operation of the rolling bearing, as a function of the play and forces, in particular centrifugal forces, applied to the balls and separators. This definition of the offset angle is valid for this entire document. A theoretical offset angle is an angle that in particular does not take into account play existing between balls and separators. Ideally, a substantially non-zero radial offset angle is sought.

The offset A3 can be in the direction of the axis X1, as illustrated in FIG. 1, and/or in the opposite direction, as illustrated in FIGS. 3 and 4.

The pronounced axial offset of the separators makes it possible to noticeably reduce the radial bulk of the rolling bearing. Thus, the assembly of the rolling bearing is facilitated in relation to the prior solutions, since the channel section is no longer in the immediate vicinity of the ring opposite that which supports that channel section, and the separators can be introduced axially in the channel section.

In one preferred configuration, not shown, the average radius of rolling of the balls is equal to the average radius of rolling of the separators, i.e. in the case where R3=R2. In this preferred configuration, there is theoretically no radial offset of the separators in relation to the balls; i.e. the theoretical angle measuring the radial offset is zero. However, in this configuration, the actual offset angle can reach 30°. This offset angle depends in particular on the values of the radii of rolling R2, R3, the diameters of the balls and separators, the transverse section of the channel section, the manufacturing limit and play. In this preferred configuration, the radial bulk is minimized, which can allow a particularly optimized arrangement.

Of course, the invention is not limited to the examples just described, and a number of developments can be made to these examples without going beyond the scope of the invention.

In particular, a protrusion as illustrated in the first embodiment can also be supported by the inner ring, rather than by the outer ring. Thus, an annulus as illustrated in the second embodiment can be fastened to the outer ring rather than to the inner ring.

Preferably, at least the raceway of the ring not supporting the channel section will be formed by a groove, preferably a deep groove.

According to the preferred embodiment, the channel section is supported by the inner ring. Studies show that in this configuration, production is facilitated and operation is improved.

The invention is not limited to rolling bearings with oblique contact, but can also be applied to straight rolling bearings.

Instead of having only one channel section, a rolling bearing according to the invention can comprise two channel sections, one on each side, such that each pair of adjacent rolling bearing balls is separated by a pair of spherical separators positioned on either side, axially, of the pair of balls.

There may be no complementary shoulders associated with an annulus supporting the channel section. Indeed, the fastening of the annulus on the ring that supports it, by nesting or adhesion, can be sufficient to pick up the axial stresses.

The invention claimed is:

1. A ball rolling bearing comprising
an outer ring and an inner ring between which the balls roll around an axis of rolling,
spherical separators for the balls, and
a raceway of revolution about the axis of rolling and along which the spherical separators roll,
wherein the raceway is a channel section supported by an element secured in rotation with the inner ring and having a substantially semi-cyclic cross section of a diameter suited to that of the spherical separators so as to accommodate the separators resting in positions in which they are (i) retained laterally and free of contact with the outer ring (ii) at a radial offset angle smaller than or equal to 60°, the angle being measured in a radial plane between, on one hand, a straight segment connecting marks left on a same side of the axis of rolling by the respective centers of the balls and the separators in the radial plane and, on the other hand, the axis of rolling.

2. The rolling bearing according to claim 1, wherein the offset angle is less than or equal to 30°.

3. The rolling bearing according to claim 1, wherein the element forms a single piece with the inner ring.

4. The rolling bearing according to claim 1, wherein the element is an annulus fastened and secured to the ring.

5. The rolling bearing according to claim 1, characterized in that the rolling bearing is a rolling bearing with oblique contact.

6. In a spacecraft incorporating a rolling bearing, the improvement wherein the rolling bearing is the rolling bearing according to claim 1.

7. In a machine incorporating a rolling bearing without lubrication, the improvement wherein the rolling bearing is the rolling bearing according to claim 1.

* * * * *